United States Patent [19]
Hoshino et al.

[11] Patent Number: 5,998,886
[45] Date of Patent: *Dec. 7, 1999

[54] POWER SUPPLY APPARATUS HAVING A FUNCTION OF COMPENSATING FOR CHANGES IN VOLTAGE

[75] Inventors: Yasutaka Hoshino; Tsutomu Fujisawa; Hideyuki Nemoto; Atsuhiro Yoshizaki, all of Hitachinaka, Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/501,227

[22] Filed: Jul. 11, 1995

[30] Foreign Application Priority Data

Jul. 15, 1994 [JP] Japan ................................. 6-163552

[51] Int. Cl.⁶ ..................................................... H02J 7/00
[52] U.S. Cl. ............................................................. 307/66
[58] Field of Search ................................. 307/64, 65, 66, 307/85, 86, 87, 147

[56] References Cited

U.S. PATENT DOCUMENTS

| | | | |
|---|---|---|---|
| 4,318,156 | 3/1982 | Gallagher | 361/358 |
| 4,475,047 | 10/1984 | Ebert, Jr. | 307/66 |
| 4,652,769 | 3/1987 | Smith et al. | 307/31 |
| 5,012,121 | 4/1991 | Hammond et al. | 307/64 |
| 5,111,058 | 5/1992 | Martin | 307/66 |
| 5,315,533 | 5/1994 | Stich et al. | 364/480 |
| 5,514,915 | 5/1996 | Kim et al. | 307/64 |
| 5,528,087 | 6/1996 | Sibata et al. | 307/66 |
| 5,579,197 | 11/1996 | Mengelt et al. | 361/93 |

*Primary Examiner*—Jeffrey Gaffin
*Assistant Examiner*—Roberto Rios
*Attorney, Agent, or Firm*—Kenyon & Kenyon

[57] ABSTRACT

According to the present invention, there are provided an input terminal, an output terminal, an a.c. generating circuit and a voltage-anomaly detecting circuit. Power supplied to the input terminal is outputted from the output terminal based on an output produced from the voltage-anomaly detecting circuit. When the voltage of the supplied power is abnormal, a.c. power produced from the a.c. generating circuit is outputted from the output terminal. Further, a boosting circuit, a rectifying circuit and a capacitor are provided. The a.c. generating circuit is constructed so as to produce a.c. power from a charged voltage of capacitor. Owing to this construction, a power supply apparatus having a function for compensating for changes in voltage can be provided which is small in size and is inexpensive.

2 Claims, 6 Drawing Sheets

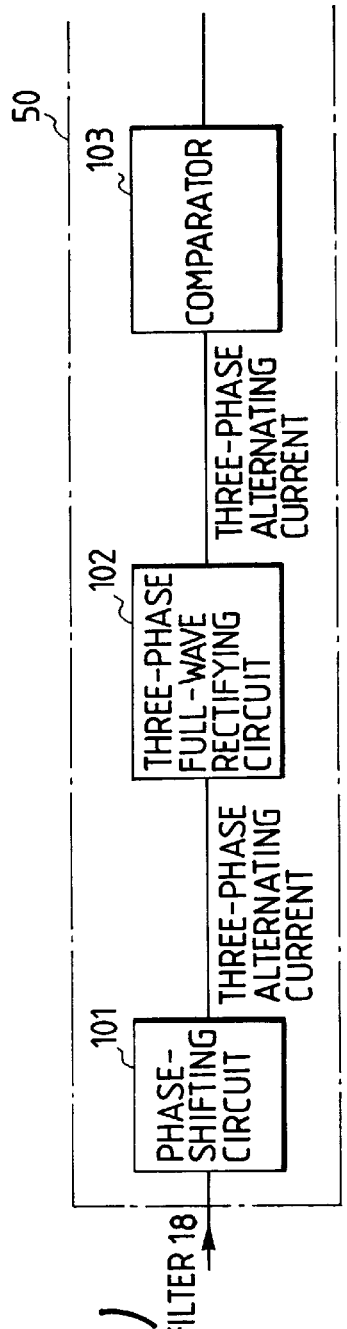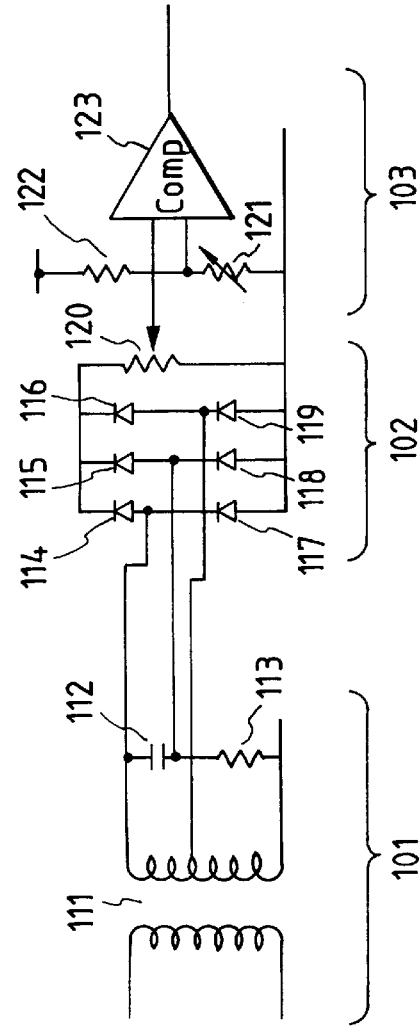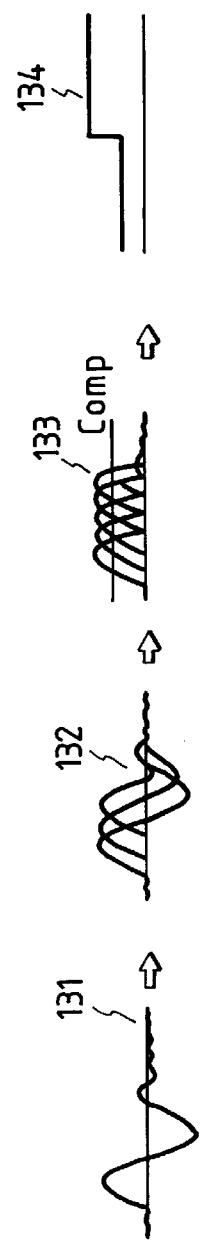

POWER SUPPLY APPARATUS HAVING A FUNCTION OF COMPENSATING FOR CHANGES IN VOLTAGE

BACKGROUND OF THE INVENTION

The present invention relates to a power supply apparatus having a function of compensating for changes in voltage.

With advances of scientific technology, the degree of dependence on an a.c. power source has been increased. Correspondingly, the a.c. power source has been stably supplied. In particular, the setting of transmission lines to a plurality of lines or circuits and the cutting off of the a.c. power source at high speed can bring about advantageous effects. It is therefore very rare to stop the supply of power.

However, when a thunderbolt or the like falls even if such protection is made, the a.c. power source greatly varies although its variation happens in a moment. Occasionally, the a.c. power source is cut off. Commercially-available devices are not affected by an instantaneous variation in the a.c. supply. However, devices are also known which are affected by the instantaneous variation in the a.c. supply. As such devices, there are known complex electrical facilities such as a semiconductor manufacturing device, etc. Therefore, the instantaneous variation in the voltage causes the stop of operations of the electrical equipment and becomes a factor that impedes production. To avoid this, a so-called power supply apparatus having a function of compensating for changes in voltage is now used wherein a power source capable of supplying power at all times is separately provided and when the a.c. power source varies in voltage, a desired voltage is supplied so as to compensate for its variation.

A typical example of this type of power supply apparatus will now be described. One terminal supplied with an input from an a.c. power source is electrically connected to one of output terminals via the primary winding of a transformer. Incidentally, the connection of the secondary winding of the transformer will be described later. In conjunction with this, the voltage supplied from the a.c. power source is rectified by a rectifier and is then stored in a capacitor. When a malfunction of the a.c. power source is detected, the voltage stored in the capacitor is converted to an alternating current by an invertor. Further, the invertor is electrically connected to the secondary winding of the transformer which couples the input terminal and the output terminal to each other. Namely, when the anomaly of the a.c. power source is detected, the voltage stored in the capacitor is supplied to the output terminal through the secondary winding of the transformer and the primary winding thereof coupling the input terminal and the output terminal to one another (first prior art).

Further, another typical example of the power supply apparatus will be described below. A voltage supplied from an a.c. power source is transformed by a transformer and is rectified by a rectifier. The rectified current is normally converted into an alternating current by an invertor so as to be supplied to an output terminal. With this, the voltage rectified by the rectifier is stored in a capacitor. When the a.c. power source now malfunctions, the voltage stored in the capacitor is converted into the alternating current by the invertor and is supplied to the corresponding output terminal (second prior art).

These compensating circuits are normally accommodated in a rack. Further, legs are mounted to the rack so that the rack is held on the ground with the legs interposed therebetween. The legs have been conventionally fixed to the rack.

Further, a certain kind of rack is required to be able to move. In this case, casters are mounted to the rack, which is held by rolling friction between the ground and the casters. The casters have been conventionally fixed to the rack.

In the first prior art, the input terminal supplied with the input from the a.c. power source is electrically connected to the output terminal via the winding of the transformer. Since a current produced from the a.c. power source normally passes through the transformer, the transformer will result in an increase in size if it is designed so as to bear the current. Therefore, the compensating circuit becomes large in size as a whole and becomes expensive.

In the second prior art, the alternating current is converted into the direct current, which is then converted into the alternating current to thereby obtain a compensating supply. Therefore, the transformer produces much losses due to such conversion and is hence unable to bear the practical use. Further, the transformer becomes complex in structure and expensive.

A first object of the present invention is to provide a power supply apparatus having a function of compensating for changes in voltage, which makes it unnecessary to use a large transformer and is reduced in size and cost.

In the prior art, for example, a human being checks the state of an output of an a.c. power source and confirms that the a.c. power source has been returned to a normal or proper state. Thereafter, a compensating source is reset to the a.c. power source. Therefore, the time required to reset the compensating source to the a.c. power source becomes relatively long. If the voltage is supplied from the compensating source for such a long time, the compensating source will result in an increase in size and cost.

A second object of the present invention is to provide a power supply apparatus having a function of compensating for changes in voltage, which is capable of holding a compensating source in a small size and being reduced in whole size and cost.

In the prior art, when a voltage produced from an a.c. power source becomes lower than a predetermined value, the a.c. power source is changed over to a compensating source. On the other hand, when the voltage of the a.c. power source becomes higher than the predetermined value, the compensating source is reset to the a.c. power source.

When the voltage produced from the a.c. power source is repeatedly raised and lowered within a relatively short time due to some reasons, the a.c. power source is often changed over to the compensating source in the case of such a construction. As a result, a transient state is produced each time the a.c. power source is changed over to the compensating source, thereby causing a problem.

A third object of the present invention is to provide a power supply apparatus having a function of compensating for changes in voltage, which is capable of bearing a variation in an a.c. power source even if such a variation is repeated within a short time.

Further, in the prior art, the value of a voltage employed in the prior art is compared with a predetermined value. Based on the result of comparison, detection is made as to whether the a.c. power source malfunctions. When such a simple comparison is made, it is difficult to virtually avoid errors in detection. Even though the a.c. power source is not brought into an abnormal or improper state, the a.c. power source is changed over to the compensating source. Further, even though the a.c. power source is brought into the improper state, the a.c. power source is not changed over to the compensating source, thereby stopping the supply of power.

A fourth object of the present invention is to provide a power supply apparatus having a function of compensating for changes in voltage, which is capable of accurately detecting an improper state and accurately changing an a.c. power source to a compensating source when the a.c. power source is brought into an improper state.

A compensating circuit is generally accommodated in a rack and legs are mounted to the rack so as to hold the rack on the ground. Since, however, the legs are fixed to the rack in the prior art, these legs will cause inconvenience when the entire apparatus is to be accommodated within a slight space, for example. When it is necessary to devise the way of disposing the apparatus, these legs will cause inconvenience when the apparatus should be changed from a vertically-disposed state to a horizontally-disposed state, for example.

A fifth object of the present invention is to provide a power supply apparatus having a function of compensating for changes in voltage, which has flexibility to the provision of the entire apparatus.

Further, in some kind of compensating circuit, casters are mounted to a rack to move the rack in such a manner that the rack is held by rolling friction between the ground and the casters. Since, however, the casters are fixed to the rack in the prior art, it is needless to say that the rack must be shifted so as to avoid an object relatively large in height, for example, thus causing inconvenience upon movement of the rack.

A sixth object of the present invention is to provide a power supply apparatus having a function of compensating for changes in voltage, which is able to easily move.

SUMMARY OF THE INVENTION

A description will now be made of constructions of the present invention, for achieving the above objects. They will be described by affixing reference numerals employed in embodiments thereto to provide easy understanding. The reference numerals are affixed for the purpose of providing easy understanding of the constructions of the present invention. The present invention is not necessarily limited to the embodiments.

In accordance with a first embodiment of the present invention, a power supply apparatus having a function for compensating for changes in voltage is disclosed. The power supply apparatus includes an input terminal supplied with a.c. power and an output terminal outputting a.c. power. An a.c. generating circuit including the series arrangement of a boosting circuit having an input coupled to the supplied a.c. power, a rectifying circuit rectifying the output of the boosting circuit, a capacitor charged by the output of the rectifying circuit and an a.c. generator having an input coupled to the capacitor is also included. The power supply apparatus further includes a voltage-anomaly detecting circuit detecting whether the voltage of the supplied a.c. power is improper whereby the supplied a.c. power is coupled to the output terminal based on an output generated from the voltage-anomaly detecting circuit when the voltage of the supplied a.c. power is proper and the a.c. power from the a.c. generating circuit is coupled to the output terminal based on the output of the voltage-anomaly detecting circuit when the voltage of the supplied a.c. power is improper. The a.c. generating circuit is constructed so as to produce a.c. power based on the charged voltage of the capacitor.

In accordance with another embodiment of the present invention, a cutoff circuit for cutting off the coupled a.c. power from the a.c. generating circuit after a predetermined time has elapsed is provided.

Another embodiment of the present invention provides the voltage anomaly detecting circuit being constructed so as to produce an output indicating of an improper state when the voltage of the supplied a.c. power is greatly deviated from a predetermined range.

Another embodiment of the present invention provides a three-phase converting circuit for converting the supplied a.c. power to a three-phase a.c. wherein the voltage-anomaly detecting circuit is constructed so as to produce an output indicative of an improper state based on at least one phase of the three-phase converting circuit.

Another embodiment of the present invention provides a compensating circuit for outputting the supplied a.c. power from the output terminal when the voltage of the supplied a.c. power is proper and outputting the a.c. power of the a.c. generating circuit from the output terminal when the voltage of the supplied a.c. power is improper.

According to a further embodiment of the present invention, a rack such that the input terminal and the output terminal are exposed for connection from the outside, whereby the rack stores the a.c. generating circuit and the compensating circuit with the rack having legs detachably mounted to the rack, for supporting the rack is provided.

A further embodiment of the present invention provides casters mounted to the rack so as to allow the rack to move.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The present invention will now be described with reference to the accompanying drawings wherein:

FIGS. 4(a) to 4(c) is views showing, in detail, circuits for detecting an abnormal voltage, which are employed in a voltage-variation detecting circuit;

DETAILED DESCRIPTION OF THE PREFERRED EMBODIMENTS

Figure 1:
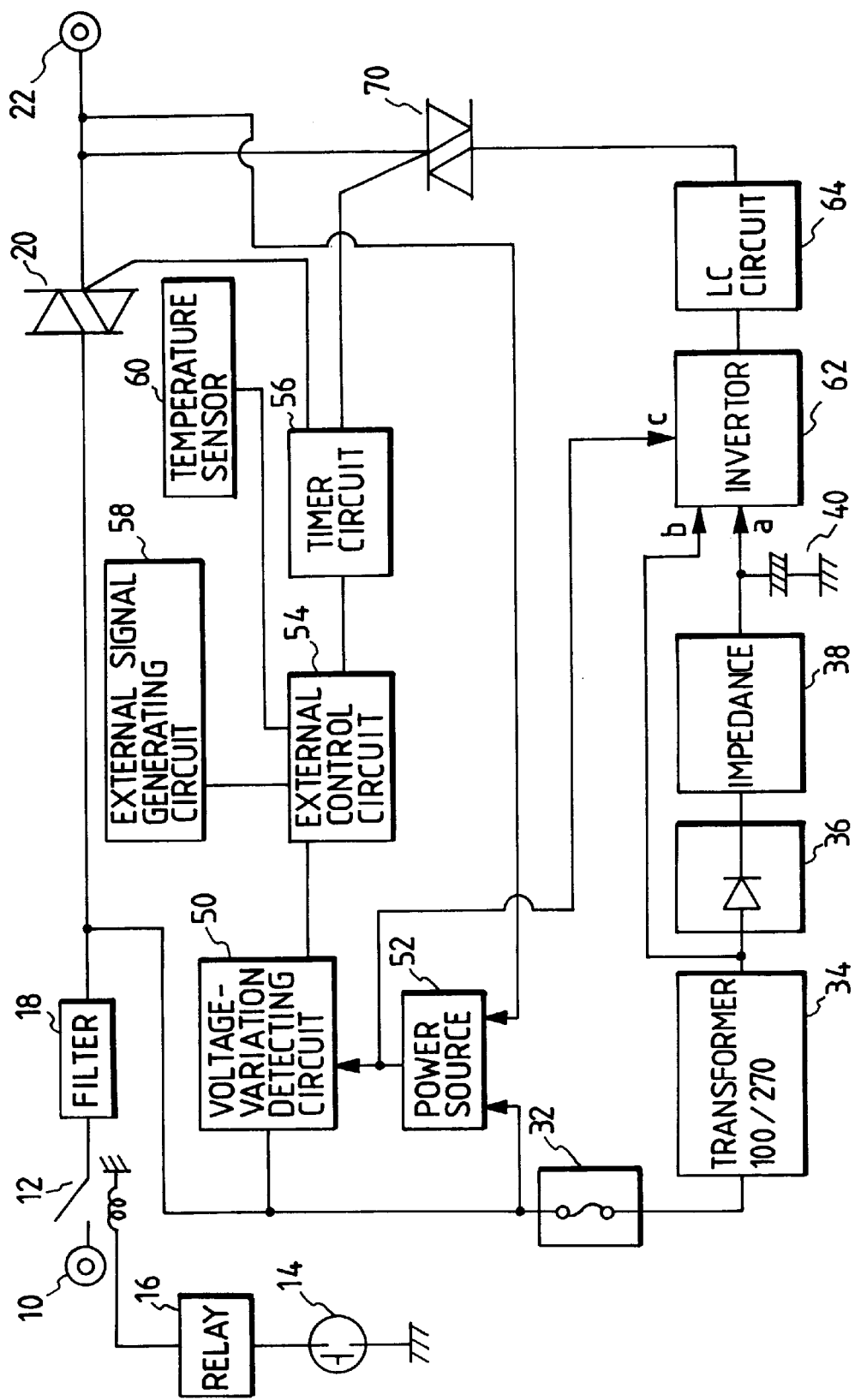
FIG. 1 is a view showing a specific circuit of an apparatus for compensating for changes in instantaneous voltage.

FIG. 1 is a view showing a specific circuit of an apparatus for compensating for changes in instantaneous voltage, according to one embodiment of the present invention. A commercial a.c. voltage is applied to an input terminal 10. The a.c. voltage is supplied to an output terminal 22 via a breaker 12, a filter 18 for eliminating high-frequency noise and a semiconductor switch 20 and outputted therefrom. The breaker 12 is activated by a relay 16 operated based on the switching action of a switch 14.

The switch 14 can be actuated to supply power to post-stage circuits to be described later such as the filter, etc. and cut off the supply of the power thereto. A description will now be made of one example of operation of the apparatus. By operating manually or automatically the switch 14 due to causes such as an improper or abnormal state, etc., which occur in poststage devices supplied with power from the output terminal 22 or in the apparatus itself, the breaker 12 can be urgently opened to immediately stop the supply of power to the devices subsequent to the breaker. It is needless to say that the apparatus can be used not at the abnormal state but even when it is desired to simply stop the supply of power.

The semiconductor switch 20 is of a circuit for supplying and cutting off an alternating current in a very short time, based on a control signal supplied from a voltage-variation detecting circuit 50 to be described later and is composed of a triac, for example. One capable of supplying and cutting off the alternating current for a short time even in the case of an element other than the triac, can be used as the semiconductor switch 20. It is needless to say that the semiconductor switch 20 may be a circuit formed by combining a plurality of semiconductor devices into one.

Next, a fuse 32, a transformer 34, a rectifier circuit 36, an impedance 38 and an electrolytic capacitor 40 constitute a d.c. charging circuit. Now, the fuse 32 is provided to cut off a short-circuit current when the electrolytic capacitor 40 is short-circuited. It is most suitable to dispose the fuse 32 as shown in the drawing from the viewpoint of cutting off of the short-circuit current on the upstream side of the charging circuit. However, if the fuse 32 is provided within the d.c. charging circuit composed of components from the transformer 34 to the electrolytic capacitor 40, then the fuse 32 can perform the action of cutting off the short-circuit current.

The transformer 34 serves so as to boost or increase an input voltage. If the input voltage is 100 V, for example, then the transformer 34 outputs a voltage such as 200 V, 270 V or the like, higher than the input voltage. An object of the transformer 34 is to charge the electrolytic capacitor 40 in minimal time after the power has been turned on, i.e., a voltage has been supplied to the charging circuit and to generate such a voltage that an a.c. voltage generated from an invertor 62 and an LC circuit 64 becomes substantially approximate to the commercial a.c. voltage inputted from the input terminal 10 as will be described later.

Namely, when the a.c. voltage inputted from the input terminal 10 is rectified and charged while remaining unboosted, a voltage outputted from the invertor 62 is apt to become less than a required voltage due to the following cause. Therefore, a problem arises that a voltage outputted from the LC circuit 64 becomes lower than a desired voltage. The boosting of the a.c. voltage by the transformer 34 is made to solve such a problem.

The following is mentioned as the cause of the problem referred to above. Namely, an actual charging voltage is lowered due to a voltage drop of the charging circuit as compared with a d.c. charging voltage generated from an ideal charging circuit for charging the a.c. voltage inputted from the input terminal 10. Alternatively, a charging voltage of the electrolytic capacitor is increased in accordance with a function of time and a voltage outputted from the electrolytic capacitor is lowered as compared with the charging voltage in the absence of a sufficient charging time. Further, the voltage outputted from the capacitor is reduced in accordance with a function of discharging time and hence the voltage is made insufficient at once with the elapse of the discharging time when the charging voltage is not boosted. The invertor 62 always causes a voltage drop thereinside and can output an intended voltage only after a voltage increased by such a voltage drop has been inputted.

As an effect obtained as a result of provision of the transformer 34 aside from this, there is an effect that a circuit on the input side of the transformer 34 and a circuit on the output side thereof are electrically separated from one another to eliminate electrical interference. This interference is as follows. Namely, when the semiconductor switch 20 and a semiconductor switch 70 are simultaneously brought into conduction, for example, the fuse 32, the rectifier circuit 36, the impedance 38, the invertor 62, the LC circuit 64 and the semiconductor switch 70 are electrically parallel-connected to the semiconductor switch 20. Alternatively, these components and the semiconductor switch 20 form a closed-loop circuit. Thus, there is a risk of allowing a current to flow due to a difference in potential or the like and causing interference. Since the transformer 34 electrically disconnects these components from the semiconductor switch 20 and magnetically connects them to one another, the difference in potential between the input side and output side of the transformer 34 can be prevented from occurring even if such a potential difference is developed. The state in which the semiconductor switches 20 and 70 are simultaneously brought into conduction, means a defective state such as a state in which either one of both semiconductor switches is short-circuited, for example. Alternatively, where the semiconductor switches 20 and 70 are respectively cutoff and brought into conduction under a command issued from the voltage-variation detecting circuit 50 when the semiconductor switches 20 and 70 are indefective but one of the semiconductor switches 20 and 70, e.g., the semiconductor switch 20 is in a conducting state and the other semiconductor switch 70 is in a cutoff state, the semiconductor switches 20 and 70 are simultaneously held in conduction while being activated in response to the above command. Such a phenomenon can occur depending on variations in characteristics of each semiconductor switch.

As the invertor 62 for converting the d.c. input to the alternating current, a commercially available product can be used. In the present embodiment, the invertor 62 generates a rough alternating current. When the LC circuit 64 is supplied with such a rough alternating current, the LC circuit 64 generates a smooth alternating circuit. In the present embodiment, the invertor 62 and the LC circuit 64 are activated as a dc-ac converter circuit for converting the direct current to the alternating circuit.

The invertor 62 includes input terminals a, b and c. A d.c. for generating an a.c. output is inputted to the input terminal a. The input terminal b is supplied with timing for generation of the a.c. output, i.e., a signal for generating an alternating current identical in phase to the a.c. voltage inputted to the input terminal 10 and providing synchronization. The invertor 62 outputs an alternating current based on the d.c. applied to the input terminal a in synchronism with the signal inputted to the input terminal b. When the alternating current supplied from the semiconductor switch 20 is changed to the alternating current supplied from the semiconductor switch 70, the electrical connection at the time of its changeover is smoothly performed. Thereafter, if the electrical connection referred to above is smoothly made even when the alternating current inputted from the input terminal 10 stops flowing and a synchronizing signal is not inputted, then a bad influence is not imposed on the device connected to the output terminal 22, for supplying the alternating current. The input terminal c is of an input terminal used for a d.c. power supply for activating the invertor 62.

The semiconductor switch 70 is of a switch for controlling whether or not the alternating current produced from the d.c. should be supplied to the output terminal 22. The semiconductor switch 70 is composed of a triac, for example. Each of the semiconductor switches 20 and 70 is controlled based on the operation of the voltage-variation detecting circuit or an external control circuit. The semiconductor switches 20 and 70 will be described in further detail below.

The voltage-variation detecting circuit 50 detects an abnormal or improper state of the alternating current supplied from the input terminal 10. The detection of a variation in voltage is intended to detect the improper state of the alternating current as described above. The voltage-variation detecting circuit 50 may not necessarily detect such a change in voltage. Alternatively, the voltage-variation detecting circuit 50 may detect a variation in current. In the present embodiment, a circuit for performing such detections is called generically as the voltage-variation detecting circuit. It is however necessary for the voltage-variation detecting circuit 50 to detect, in minimal time, a case where a power failure in transmission line occurs for a short time (ranging from several ten msecs to several hundreds msecs) due to the influence of thunder. A method of detecting the variation in voltage provides an easy detection as compared with other methods.

A power source 52 is of one for supplying a d.c. voltage required to activate the voltage-variation detecting circuit 50. The power source 52 can generate the d.c. voltage, based on the voltage supplied from the input terminal 10, i.e., a voltage on the input side of the semiconductor switch 20 or generate the d.c. voltage, based on a voltage outputted from the output terminal 22. The power source 52 has a merit in that if the d.c. voltage is generated based on the voltage outputted from the output terminal 22, then the power source 52 can be activated based on a voltage generated from the invertor 62 and the LC circuit 64 even in the case where the voltage inputted to the input terminal 10 is improper. In this case, the breaker 12 is open and the a.c. voltage is not yet supplied to the output terminal 22 when the breaker 12 is firstly turned on. Hence the power source 52 cannot supply a voltage to the voltage-variation detecting circuit 50. Thus, the voltage-variation detecting circuit 50 cannot output a control signal to each of the semiconductor switches 20 and 70 in this case. It is necessary in this case to bring the semiconductor switch 20 into conduction under the action of an external control circuit 54 or a timer circuit 56 and cut off the semiconductor switch 70.

When the power source 52 is activated based on the alternating current supplied to the input terminal 10, the circuit shown in FIG. 1 is intended to cope with a voltage drop (also including a power failure) developed in a short time of about 0.5 sec or less in the first place. If a circuit having a function that bears such a voltage drop developed in the short time and is capable of maintaining the supply of a required voltage, is set to the power source 52, this type of problem can be solved.

In response to a signal supplied from an external signal generating circuit 58 or a signal produced from a sensor 60 for monitoring the temperature of the semiconductor switch, the external control circuit 54 generates a signal for forcefully controlling the semiconductor switches 20 and 70, e.g., a signal for cutting off a semiconductor switch being in a conducting state or a signal for bringing a semiconductor switch being in a cutoff state into conduction, regardless of the output of the voltage-variation detecting circuit 50. Further, the external control circuit 54 supplies the signal to each of the semiconductor switches 20 and 70 through the timer circuit 56. Thus, since the external signal generating circuit 58 forcefully stops the supply of the output from the output terminal 22 even though the normal alternating current is being supplied from the input terminal 10, for example, the external control circuit 54 can perform control for forcefully cutting off the semiconductor switches 20 and 70. When the temperature of the semiconductor switch 20 becomes higher than a predetermined value (second level), the external control circuit 54 can cut off the semiconductor switch 20 or can bring the semiconductor switch 70 into conduction simultaneously with temporary cutoff of the semiconductor switch 20 in some cases.

Incidentally, an alarm may be produced when the temperature of the semiconductor switch 20 increases over a first level lower than the second level. It is desired that, for example, a red lamp is allowed to glow or a sound is produced from a buzzer as the alarm. Alternatively, information that the temperature of the semiconductor switch 20 has become higher than the first level, may be sent to the voltage-variation detecting circuit 50. Further, after the voltage-variation detecting circuit 50 has counted the number of information and has judged that the circuit is in an abnormal or improper condition when the count has exceeded a predetermined number of times, the voltage-variation detecting circuit 50 may produce a higher level warning or perform suitable control.

The timer circuit 56 serves so as to forcefully cut off the semiconductor switch 70 after the elapse of a predetermined time interval. The predetermined time interval represents a predetermined time of 1 sec. or less, e.g., 0.5 sec. The circuit shown in FIG. 1 is used to compensate for cutting off of the alternating current supplied to the input terminal 10, which is made for a very short time such as a time less than 0.5 sec. or for a reduction in voltage during that time under the influence of thunder. This circuit is not intended to compensate for a long-duration power failure. Therefore, the d.c. power supply composed of the charging circuits 34, 36 and 38 and the capacitor 40 has a function of supplying a direct current only for the short time referred to above and is not intended to cope with a long time. Thus, components or parts forming the circuit are reduced in size and cost and the dc power supply is so reduced in size and cost as a whole, thereby making it possible to provide convenience for its installation. On the other hand, when the d.c. power supply is activated over an expected time, the voltage inputted to the invertor 62 is reduced under the discharge of the capacitor 40, so that a predetermined ac voltage cannot be generated. Since the d.c. is supplied from the capacitor 40, the invertor 62 is continuously supplied with the d.c. reduced in voltage at all times, thus resulting in the ever-supply of an alternating current reduced in voltage and quality. The timer circuit 56 can cut off the semiconductor switch 70 and is able to stop the supply of the voltage reduced in quality. Even if the power source used for devices connected to the output terminal 22 erroneously remains connected upon maintenance and inspection of the devices, safety can be ensured so long as the semiconductor switch 70 is cut off by the timer circuit 56.

Figure 2A:
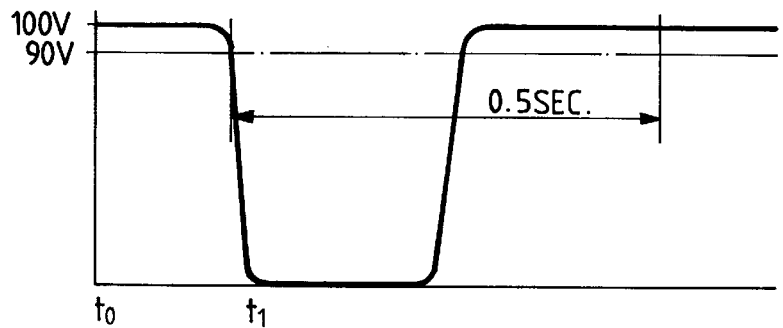
FIGS. 2(a) to 2(d) is views for describing the operation of the apparatus shown in FIG. 1.
Figure 2B:
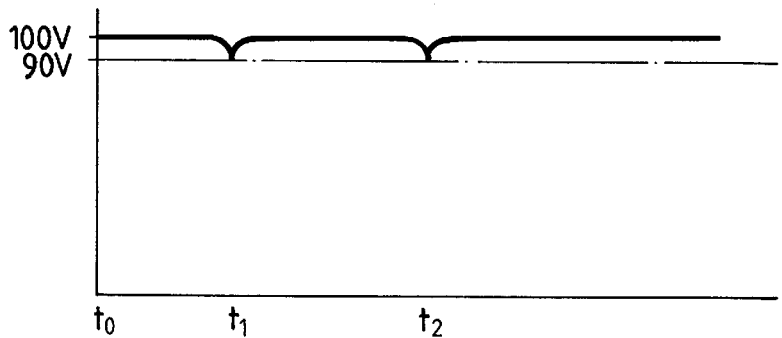
Figure 2C:
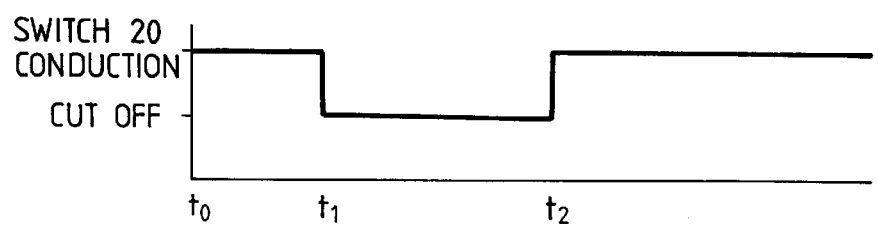
Figure 2D:
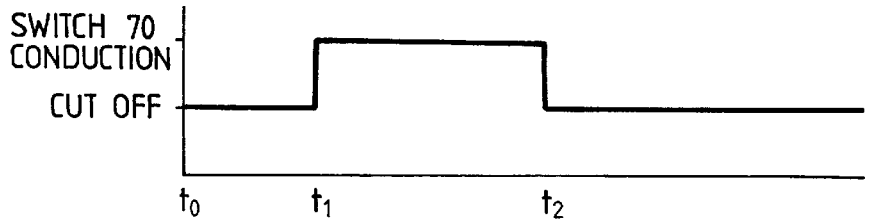

The operation of the circuit shown in FIG. 1 will now be described with reference to FIG. 2. When the voltage at an alternating current bus electrically connected to the input terminal 10 reaches a predetermined value such as a 10%-varied voltage, i.e., 90 V or less if the a.c. voltage inputted to the input terminal 10 is 100 V, the voltage-variation detecting circuit 50 detects it and cuts off the semiconductor switch 20 so as to bring the semiconductor switch 70 into conduction. FIG. 2(a) shows the waveform of the alternating current inputted to the input terminal 10. Assuming now that the normal alternating current is inputted at a time to, the capacitor 40 is supplied with the direct current under the operation described above and the charging voltage is inputted to the input terminal a of the invertor 62. Thus, the invertor 62 generates a rough alternating current and the LC circuit 64 produces an alternating current high in quality and supplies it to the semiconductor switch 70. However, the semiconductor switch 70 is brought into a cutoff state under the action of the voltage-variation detecting circuit 50 and the output terminal 22 is supplied with the alternating current inputted to the input terminal 10 and shown in FIG. 2(*a*) via the semiconductor switch 20.

Now consider that the voltage is reduced to a predetermined value or less at a time $t_1$. At the time $t_1$, the voltage-variation detecting circuit 50 is activated so as to cut off the semiconductor switch 20 and bring the semiconductor switch 70 into conduction. FIG. 2(*c*) shows the waveform of an output produced from the semiconductor switch 20. At a time $t_1$, the supply of the alternating current is stopped. On the other hand, FIG. 2(*d*) illustrates the waveform of an output produced from the semiconductor switch 70. At a time $t_1$, the alternating current is supplied. Thus, the output terminal 22 can be continuously supplied with an alternating current high in quality as an output as shown in FIG. 2(*b*). When a state in which the voltage has reached a predetermined value or less at the time $t_1$ continues for a predetermined time (such as 0.2 sec.), the semiconductor switch 20 may be cut off or deactivated so as to bring the semiconductor switch 70 into conduction.

Although there is a case in which the voltage at the alternating current bus is often brought into an abnormal or improper state due to the falling of a thunderbolt for a time interval ranging from several tens msecs. to several hundreds msecs, this state is recovered to the original state within 0.35 sec at longest. Now consider that this state is recovered at a time $t_2$ corresponding to a time less than 0.35 sec. At the time $t_2$, the voltage-variation detecting circuit 50 detects that this state has been recovered and generates a control signal for bringing the semiconductor switch 20 into conduction and cutting off the semiconductor switch 70. The semiconductor switches 20 and 70 are controlled based on the control signal through the external control circuit 54 and the timer circuit 56 to thereby bring the semiconductor switch 20 into conduction and cut off the semiconductor switch 70. Since the current to be used up by the invertor 62 is reduced, a charging current increases due to the discharge of the capacitor 40 so that the capacitor 40 is charged again. As shown in FIG. 2(*b*), the alternating current good in quality, which is not affected by the improper state of the input alternating current, is supplied from the output terminal 22.

Incidentally, the voltage-variation detecting circuit 50 may judge that the above state has been recovered when the voltage at the input terminal 10 has reached 95% (95 V). Thus, even when the voltage at the input terminal 10 is subjected to hunting before and after 90% if the hysteresis effect is provided, the semiconductor switches 20 and 70 can be controlled without being affected by the hunting. Further, both the semiconductor switches 20 and 70 may be brought into conduction for a slight time interval.

If the input applied to the input terminal 10 remains at the improper state over the predetermined time as described above, then the current supplied to the invertor 62 from the capacitor 40 increases with an increase in the current outputted to the output terminal 22 to thereby abruptly discharge the capacitor 40. Thus, since the alternating current high in quality cannot be supplied so long as the input is kept abnormal over the predetermined time, the semiconductor switch 70 is cut off by the timer circuit 56. Incidentally, the state of discharge of the capacitor 40 is determined depending on the discharge current supplied to the invertor 62. Therefore, a predetermined time required to cut off the semiconductor switch 70 by the timer circuit 56 after the elapse of the predetermined time may be set constant but may be determined depending on the discharge current. The predetermined time may be set to the time when it is detected that the terminal voltage of the capacitor 40 has been reduced to a predetermined value or less.

When the a.c. voltage supplied to the input terminal 10 is proper, the semiconductor switch 20 and the semiconductor switch 70 are respectively brought into the conducting state and the cutoff state as mentioned above. In this condition, the capacitor 40 is charged with the d.c. and the invertor 62 continues to generate the alternating current as described above. Since the semiconductor switch 70 is in the cutoff state, the voltage generated from the invertor 62 is cut off by the semiconductor switch 70 and hence power outputted from the invertor 62 is extremely reduced. Thus, heat is far less generated even though the invertor 62 and the LC circuit 64 are activated at all times. Therefore, the invertor 62 and the LC circuit 64 may be designed so as to be able to cope with the heat generated for a short time during which the semiconductor switch 70 is activated (brought into conduction). Further, the invertor 62 and the LC circuit 64 can be reduced in size and cost. The capacitor 40 is charged when the a.c. voltage is proper and supplies the d.c. to the invertor 62 at all times. Since the power outputted from the invertor 62 is extremely low as mentioned above when the a.c. voltage is normal, the discharge current of the capacitor 40, which flows owing to the supply of the d.c. to the invertor 62 from the capacitor 40, is much decreased. Thus, although the discharge current flows at all times, a bad influence is not exerted on the invertor 62 in particular.

In the present embodiment, an electrolytic capacitor is used as the capacitor 40 employed as a means for storing d.c. energy therein. This is because the electrolytic capacitor is very long-lived. The life of the electrolytic capacitor greatly depends on the temperature. If the working temperature of the electrolytic capacitor is reduced 10 degrees, then the life of the electrolytic capacitor becomes twice. If the working temperature is raised to the contrary, an evaporative splash of an electrolytic solution occurs and hence characteristics are deteriorated on an accelerative basis. Electrolytic capacitors generally used for removal of ripple and the like cause an increase in the temperature of an internal electrode due to a ripple current as well as an increase in ambient temperature and the life of each electrolytic capacitor is considered to range from three years to five years. In the present embodiment, however, the life becomes very long-lived due to the following reasons (1) to (4). (1): Since the action of repeatedly charging and discharging the capacitor 40 is hardly made after the capacitor 40 has been charged upon turning on the breaker 12, the current hardly flows and self-generated heat is far less reduced. A description has been already made of the case where the abnormal or improper state often occurs in the short time due to the thunder. This is however related to a relative problem. The frequency of occurrence of the improper state tends to increase if the improper state or malfunction takes place five times or more per year. The frequency of occurrence of the malfunction does not reach ten times. It is thus considered that the capacitor is always in a saturated and charged state. It may therefore be only enough to mention a non-load current to be supplied to the invertor 62 as the current to flow therein. Hence the current hardly flows. (2): The ripple current does not flow. Further, the capacitor is charged to a substantially saturated state as described in the item (1) and hence the ripple current hardly flows. (3): The improper state of the voltage supplied to the input terminal 10 is slightly produced. The increase in the temperature of the internal electrode due to the charge and discharge currents, which is produced at this time, is almost negligible from the viewpoint of the whole usage of the capacitor. Further, deterioration of the capacitor incident to the temperature rise can be also minimized. (4): Since the number of times in which the semiconductor switch 70 is brought into conduction due to the improper state of the supplied voltage and the time required to bring the semiconductor switch 70 into conduction, are so reduced, heat generated from the circuit such as the transformer 34, the rectifier circuit 36, the impedance 38, the capacitor 40, the invertor 62, the LC circuit 64 or the like is far less produced. Further, the ambient temperature of the arranged capacitor 40 is identical substantially to room temperature. Therefore, the temperature of the capacitor 40 is low and the capacitor 40 becomes long-lived. Assuming now that the ambient temperature is 40 degrees, the life of the capacitor 40 becomes about 14 years. Also assuming that the ambient temperature is 30 degrees, the life of the capacitor 40 becomes 28 years. If the ambient temperature is assumed to be 23 degrees, then the life of the capacitor 40 becomes 46 years. In the method according to the present embodiment, the capacitor becomes very long-lived as compared with a battery.

When a third switch capable of connecting the input terminal 10 and the output terminal 22 to each other is provided and the semiconductor switch 20 is brought into a heated state or the output of the invertor 62 is brought into an improper state, both terminals 10 and 20 may be connected to each other by the third switch. The third switch is normally in a cutoff state.

Figure 3:
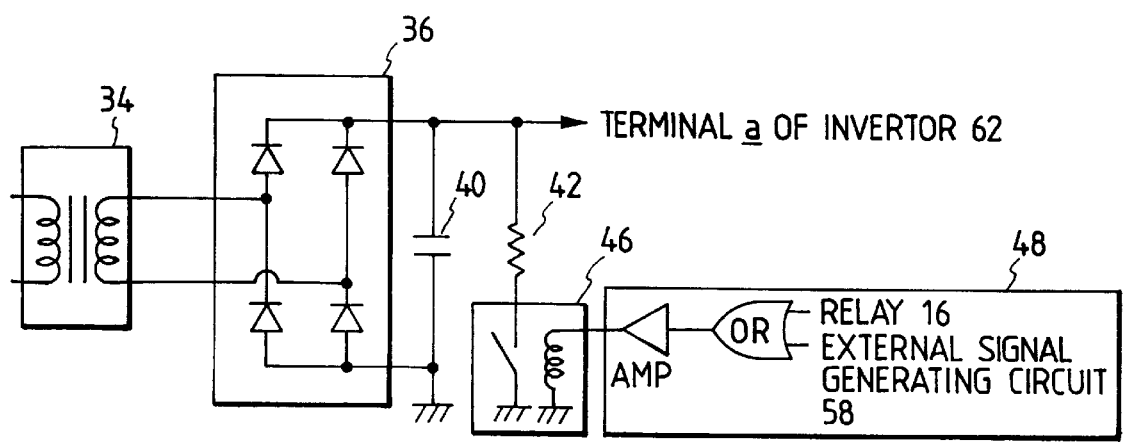
FIG. 3 is a view illustrating peripheral circuits of an invertor 62 in detail.

FIG. 3 shows a safety device. When power transmitted to the input terminal 10 is cut off in FIG. 1, there is a possibility of human hands touching the output terminal 22 or a stage subsequent to the output terminal 22 considering the output of the output terminal 22 not to be yet produced. Further, one may put his/her hands on a device in which the circuit shown in FIG. 1 has been realized, as well as on the stage subsequent to the output terminal 22. A description has been previously made of the case where the power inputted to the input terminal 10 is cut off. There is however a case in which the input power is cut off at a stage preceding the input terminal 10. There is also an alternative case in which the breaker 12 employed in the present embodiment is made open. Owing to the causes of improper or defective conditions of the circuit shown in FIG. 1 or defective conditions of the circuit connected subsequently to the output terminal shown in FIG. 1, the above measures are taken to reduce damage based on these defective conditions. FIG. 3 illustrates one example of one of the measures. In FIG. 3, the action of opening the breaker 12 is detected based on an actuating signal of the relay 16. Further, the detected signal is inputted to an OR gate of a power cutoff detecting circuit 48 or a signal generated from other circuit 58 is inputted to the OR gate.

The other circuit 58 is of a circuit for generating a signal according to the defective conditions of the circuit shown in FIG. 1 or the defective conditions of the circuit subsequent to the circuit shown in FIG. 1. Namely, the power cutoff detecting circuit 48 detects a state in which the voltage is not generated within the circuit shown in FIG. 1 or a state in which the power is not outputted. The power cutoff detecting circuit 48 may detect, for example, a state in which a door for putting human hands on parts provided inside the realized device shown in FIG. 1 is open. Alternatively, the power cutoff detecting circuit 48 may detect a state in which a high-voltage partial safety cover other than the door is open.

Thus, when, for example, a state of generation or stoppage of the voltage from the invertor 62 is detected by the power cutoff detecting circuit 48, a switch 46 is closed to thereby form a discharging circuit of the capacitor 40 so as to discharge power held in the capacitor 40. A resistor 42 is of one for suppressing the maximum discharge current and prevents a large discharge current that causes breakage and abrupt deterioration of the capacitor 40.

The resistor 42 and the switch 46 are electrically connected between the input terminal a of the invertor 62 shown in FIG. 1 and an earth terminal. The discharging circuit having the resistor 42 and the switch 46 can discharge not only the power stored in the capacitor 40 but also power held in an unillustrated capacitor provided inside the invertor 62 even if such power is stored in the capacitor, thereby making it possible to improve safety. When the switch 46 is closed, the resistor 42 provides an effect for limiting a short-circuit current flowing in the capacitor 40 or the circuit for charging the capacitor 40 and controlling the maximum value of a discharge current of the invertor 62 as needed.

The discharging circuit having the resistor 42 and the switch 46 both shown in FIG. 3 may be provided between an output terminal of the rectifier circuit 36 shown in FIG. 1 and the earth. Since the impedance 38 acts in a manner similar to the resistor 42 in this case, the resistor 42 can be reduced in value or omitted.

In FIG. 3, the switch 46 is provided on the earth side, i.e., the low voltage side of the resistor 42. A voltage applied to the switch 46 can be lowered by providing the switch 46 having a movable member on the earth side. It is desired to take the above arrangement in terms of safety of maintenance and inspection.

A description will now be made of a detailed one example of a malfunction detecting circuit in the voltage-variation detecting circuit 50. Referring to FIG. 4, an a.c. voltage supplied from the input terminal 10 is inputted to a phase-shifting circuit 101 through the filter 18. The phase-shifting circuit 101 converts an a.c. waveform 131 (see FIG. 4(c)) to a three-phase a.c. waveform 132 (see FIG. 4(c)). The three-phase a.c. waveform 132 is converted to a three-phase pulsating-current waveform 133 (see FIG. 4(c)) by a three-phase full-wave rectifying circuit 102. Further, the three-phase pulsating-current waveform 133 is compared with a predetermined voltage (90 V, for example) by a comparator 103. When the three-phase pulsating-current waveform 133 is lower than the predetermined voltage, the comparator 103 changes an output pulse from an OFF output to an ON output.

Further, specific circuits will be described in detail. The phase-shifting circuit 101 comprises a transformer 111, a capacitor 112 and a resistor 113. The primary winding in the transformer 111 is electrically connected to the filter 18. On the other hand, a capacitor 112 and a resistor 113 are electrically series-connected between two output terminals of the second winding thereof. The three-phase full-wave rectifying circuit 102 is composed of diodes 114 through 119. Respective phases of the three-phase a.c. 132 are respectively outputted to a point to which the diodes 114 and 117 are connected, a point to which the diodes 115 and 118 are connected and a point to which the diodes 116 and 119 are connected. Respective phases of the three-phase pulsating current 133 outputted from the three-phase full-wave rectifying circuit 102 are respectively inputted to one input terminal of the comparator 123 through a variable resistor 120. A voltage adjusted by a resistor 122 and a variable resistor 121 is applied to the other input terminal of the comparator 123. The comparator 123 compares these with one another and outputs a pulsated output voltage therefrom.

Figure 5:
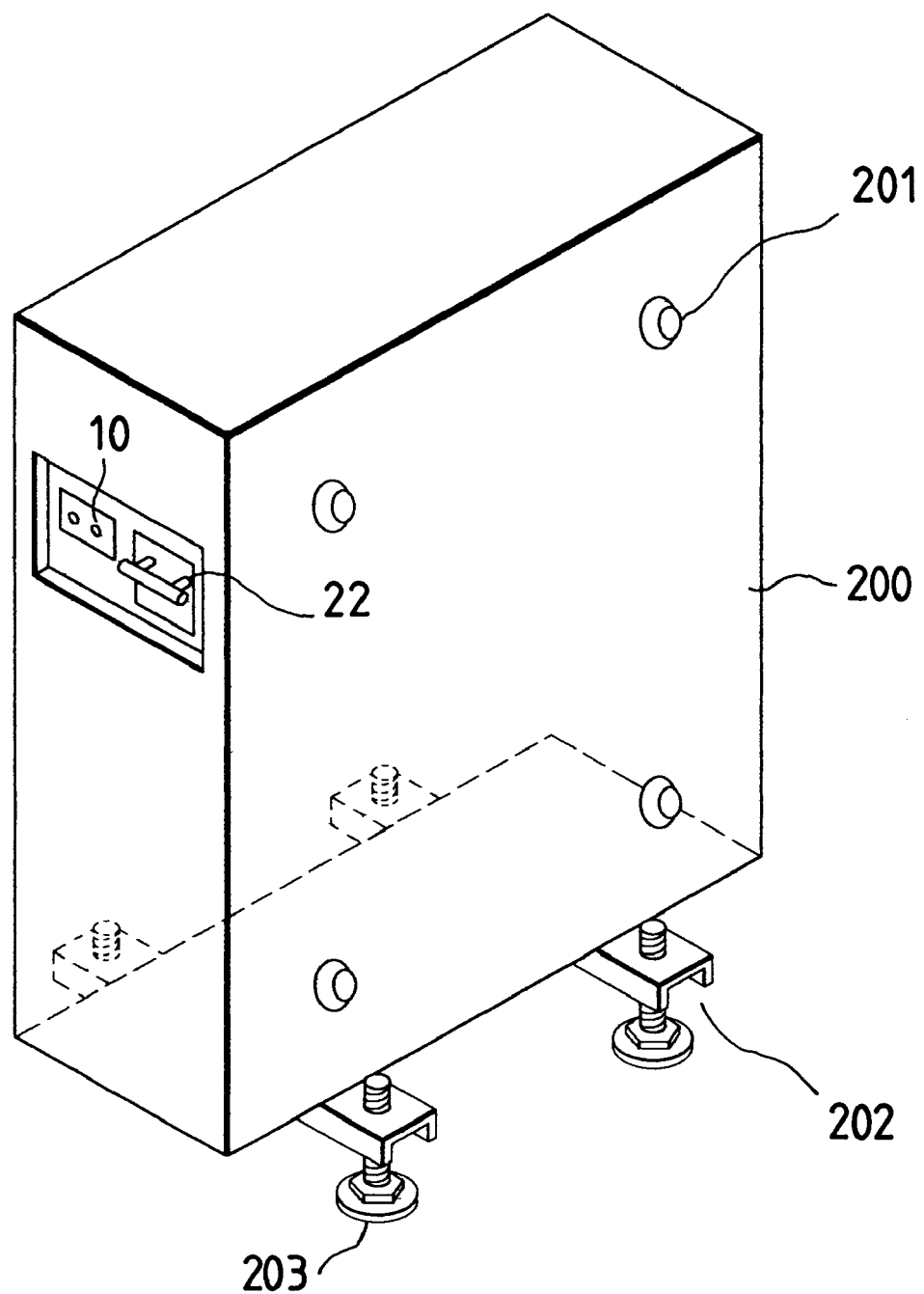
FIG. 5 is a view illustrating a rack.

A description will now be made of a rack implicating the object of the apparatus shown in FIG. 1. In FIG. 5, the input terminal 10 and the output terminal 22 are provided side by side on a side face of the rack 200. Rubber legs 201 are provided at the four corners of the rack 200 so as to be disposed on the other side face of the rack 200. The rubber legs 201 are disposed so as to provide convenience when the rack 200 is laid down. Adjusters 203 are provided at the bottom face of the rack 200 via fittings against overturning 202. Each of the fittings 202 has a width broader than the bottom face of the rack 200 and is used to support the rack 200. Further, the fittings 202 are fixed to the rack 200 by screws. Under the rotation of the screws, the fittings 202 and the adjusters 203 adjust the height of the rack 200 as seen from the ground. The rack 200 is detachable and attachable by a screw mechanism.

The rack 200 is fixed to the fittings 202. The rack 200 can be elevated or lowered by rotating the screws of the adjusters 203. Further, when the screws of the adjusters 203 are rotated, the adjusters 203 can be detached from the rack 200.

Figure 6:
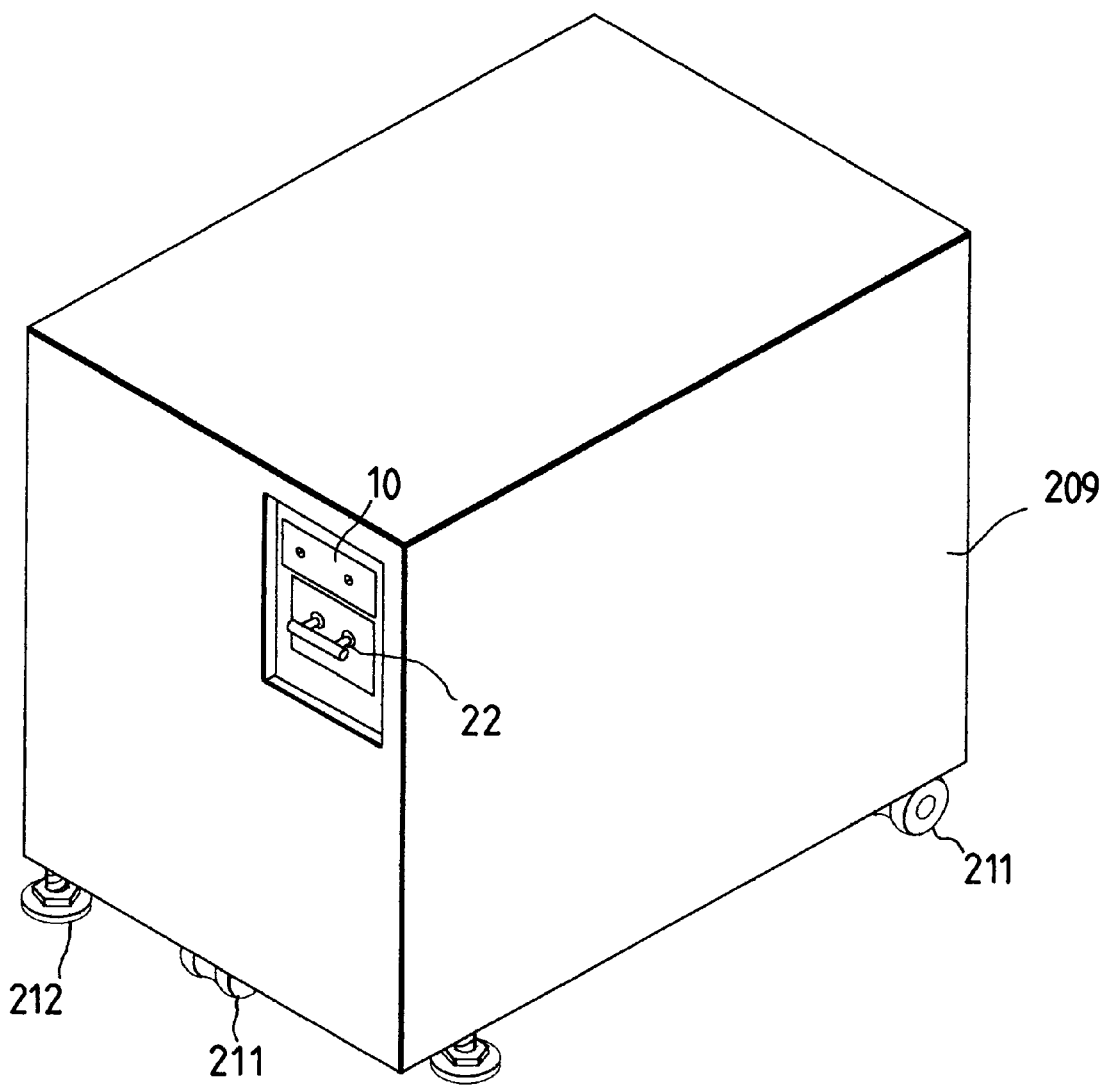
FIG. 6 is a view showing another rack.

A description will now be made of an example of other rack. A rack 209 is designed so as to provide convenience for transportation as a principal. In FIG. 6, adjusters 212 are located in four places of the bottom face of the rack 209. Further, casters 211 are located in three places of the bottom face of the rack 209. When screws of the adjusters 212 are rotated and the height of the rack 209 is lowered, the casters 211 are brought into contact with the ground. If such a state is set, then the rack 209 can be easily moved by the casters 211.

On the other hand, when the screws of the adjusters 212 are rotated and the height of the rack 209 is increased, the casters 211 are spaced away from the ground to bring the rack 209 to a fixed state. The casters 211 and the rack 209 may be provided so that the distance therebetween can be adjusted. To this end, the rack 209 may be connected to the casters 211 via the adjusters of the rack 209.

According to the first invention as has been described above, an a.c. power source is cut off or shut down when the a.c. power source malfunctions and a voltage supplied from the a.c. power source can be coupled as it is when the a.c. power source functions normally. The a.c. power source is electrically connected to an output terminal as it is without a transformer or the like. It is therefore possible to detect a malfunction of the a.c. power source and compensate for the a.c. power source without using a large transformer. Thus, the apparatus can be reduced in size and cost.

According to the second invention, the supply of a voltage from a compensating circuit is finished after the elapse of a predetermined time and the voltage supplied from the a.c. power source is outputted to the output terminal. Therefore, the compensating circuit can be prevented from becoming large-sized and complex, thereby making it possible to reduce the apparatus in size and cost.

According to the third invention, when the a.c. power source greatly varies beyond a predetermined range, it is judged that the a.c. power source is improper and the a.c. power source is switched over to the compensating circuit. Even when the a.c. power source is repeatedly varied in a short time to this end, it is possible to suitably detect a malfunction of the a.c. power source and compensate for the a.c. power source.

According to the fourth invention, an a.c. voltage is converted to a three-phase alternating current. An improper state of the a.c. voltage is detected by detecting the three-phase a.c. Therefore, the accuracy of detecting the malfunction of the a.c. power source can be improved, thereby making it possible to suitably detect the malfunction and compensate for the a.c. power source.

According to the fifth invention, legs can be attached to a rack and detached therefrom and the flexibility of installation of the apparatus can be ensured.

According to the sixth invention, the apparatus can be easily moved by casters.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A power supply apparatus which compensates for changes in voltage, comprising:

an input terminal supplied with A.C. power;

an output terminal outputting A.C. power;

an A.C. generating circuit which includes a series arrangement of a boosting circuit having an input coupled to said supplied A.C. power, a rectifying circuit rectifying an output of said boosting circuit, a capacitor charged by an output of said rectifying circuit and an A.C. generator having an input coupled to said capacitor;

a voltage-anomaly detecting circuit which detects whether the voltage of the supplied A.C. power is improper;

a first switch positioned between said input terminal and said output terminal; and a second switch positioned between said A.C. generating circuit and said output terminal;

wherein said first switch is brought into a conducting state and said second switch is brought into a cut off state so as to couple the supplied A.C. power to said output terminal when the voltage of the supplied A.C. power is proper, said second switch is brought into the conducting state and said first switch is brought into the cut off state so as to couple the A.C. power from said A.C. generating circuit to said output terminal based on the output of said voltage-anomaly detecting circuit when the voltage of the supplied A.C. power is improper.

2. The power supply apparatus according to claim 1, wherein said second switch is brought into a cut off state after a predetermined time has elapsed since said second switch is brought into a conducting state.

* * * * *